US012755747B2

(12) United States Patent
Sun et al.

(10) Patent No.: US 12,755,747 B2
(45) Date of Patent: Oct. 6, 2026

(54) ROBUSTNESS/PERFORMANCE IMPROVEMENT FOR DEEP LEARNING BASED SPEECH ENHANCEMENT AGAINST ARTIFACTS AND DISTORTION

(71) Applicant: DOLBY LABORATORIES LICENSING CORPORATION, San Francisco, CA (US)

(72) Inventors: Jundai Sun, Beijing (CN); Lie Lu, Dublin, CA (US); Zhiwei Shuang, Beijing (CN)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 126 days.

(21) Appl. No.: 18/282,311

(22) PCT Filed: Mar. 17, 2022

(86) PCT No.: PCT/US2022/020790

§ 371 (c)(1),
(2) Date: Sep. 15, 2023

(87) PCT Pub. No.: WO2022/203939

PCT Pub. Date: Sep. 29, 2022

(65) Prior Publication Data

US 2024/0161766 A1 May 16, 2024

Related U.S. Application Data

(60) Provisional application No. 63/180,705, filed on Apr. 28, 2021.

(30) Foreign Application Priority Data

Mar. 22, 2021 (WO) ................ PCT/CN2021/082199
Jun. 8, 2021 (EP) .................................... 21178178

(51) Int. Cl.
*G10L 21/0232* (2013.01)
*G10L 25/30* (2013.01)

(52) U.S. Cl.
CPC .......... *G10L 21/0232* (2013.01); *G10L 25/30* (2013.01)

(58) Field of Classification Search
CPC ............................ G10L 21/0232; G10L 25/30
See application file for complete search history.

(56) References Cited

U.S. PATENT DOCUMENTS 7,464,029 B2 12/2008 Erik
8,326,614 B2 12/2012 Paranjpe
(Continued)

FOREIGN PATENT DOCUMENTS

CN 106782511 A 5/2017
CN 109410976 A 3/2019
(Continued)

OTHER PUBLICATIONS

Lee et al., Hypo and Hyperarticulated Speech Data Augmentation for Spontaneous Speech Recognition, 2018 26th European Signal Processing Conference (EUSIPCO), 2018 (Year: 2018).*
(Continued)

*Primary Examiner* — Bhavesh M Mehta
*Assistant Examiner* — Eunice Lee

(57) ABSTRACT

Described is a method of processing an audio signal. The method includes a first step for applying enhancement to a first component of the audio signal and/or applying suppression to a second component of the audio signal relative to the first component, and a second step of modifying an output of the first step by applying a deep learning based model to the output of the first step, for perceptually improving the first component of the audio signal. Also described is an
(Continued)

apparatus for carrying out the method, as well as corresponding programs and computer-readable storage media.

17 Claims, 4 Drawing Sheets

(56) References Cited

U.S. PATENT DOCUMENTS

| | | | |
|---|---|---|---|
| 8,606,566 | B2 | 12/2013 | Li |
| 11,100,941 | B2 | 8/2021 | Sargsyan |
| 2004/0199384 | A1 | 10/2004 | Hong |
| 2014/0025374 | A1 | 1/2014 | Lou |
| 2017/0004844 | A1 | 1/2017 | Short |
| 2017/0032802 | A1 | 2/2017 | Senior |
| 2018/0090152 | A1 | 3/2018 | Ichimura |
| 2019/0208317 | A1 | 7/2019 | Woodruff |
| 2019/0318755 | A1 | 10/2019 | Tashev |
| 2020/0058314 | A1 | 2/2020 | Le Roux |
| 2020/0312343 | A1 | 10/2020 | Hsiung |

FOREIGN PATENT DOCUMENTS

| | | | | |
|---|---|---|---|---|
| CN | 111971743 A | 11/2020 | |
| EP | 2360685 A1 | 8/2011 | |
| EP | 3716270 A1 * | 9/2020 | ............ G06N 3/044 |
| JP | 2006126841 A | 5/2006 | |
| RU | 2517315 C2 | 5/2014 | |
| WO | 2020110228 | 6/2020 | |
| WO | 2020232180 A1 | 11/2020 | |
| WO | 20200232180 A1 | 11/2020 | |
| WO | 2021044647 | 3/2021 | |

OTHER PUBLICATIONS

Denoyer et al., Deep Sequential Neural Network, arXiv:1410.0510, 2014 (Year: 2014).*

Strake et al., Separated Noise Suppression and Speech Restoration: Lstm-Based Speech Enhancement in Two Stages, 2019 IEEE Workshop on Applications of Signal Processing to Audio and Acoustics (WASPAA), 2019 (Year: 2019).*

Strake et al., Speech enhancement by LSTM-based noise suppression followed by CNN-based speech restoration. EURASIP Journal on Advances in Signal Processing, 2020 (Year: 2020).*

Hao et al., Masking and Inpainting: A Two-Stage Speech Enhancement Approach for Low SNR and Non-Stationary Noise, IEEE International Conference on Acoustics, Speech and Signal Processing (ICASSP), 2020 (Year: 2020).*

Ramezanpour, et al., Two-stage beamforming for rejecting interferences using deep neural networks. IEEE Systems Journal, 15(3), 2020 (Year: 2020).* https://lilianweng.github.io/lil-log/2018/08/12/from-autoencoder-to-beta-vae.html copy attached (Year: 2018).*

Wang et al., Time Frequency Masking for Speech Separation and Its Potential for Hearing Aid Design, Trends in Amplification, vol. 12, No. 4, 2008 (Year: 2008).*

Pandey et al., Densely connected neural network with dilated convolutions for real-time speech enhancement in the time domain, IEEE International Conference on Acoustics, Speech and Signal Processing ICASSP, 2020 (Year: 2020).*

Zhao et al., A two-stage algorithm for noisy and reverberant speech enhancement, 2017 IEEE International Conference on Acoustics, Speech and Signal Processing (ICASSP), 2017 (Year: 2017).*

Kontio et al., Neural Network-Based Artificial Bandwidth Expansion of Speech, IEEE Transactions on Audio, Speech, and Language Processing, vol. 15(3), 873-881, 2007 (Year: 2007).*

Fahimeh Bahmaninezhad, A Unified Framework for Speech Separation, Dec. 17, 2019, 12 pages, Located Via: Engineering Village(Compendex, Inspec): Technical Literature Search, US.

Kim Minje et al., Adaptive Denoising Autoencoders: A Fine-Tuning Scheme to Learn from Test Mixtures, Aug. 25-28, 2015, pp. 100-107, 8 pages, vol. 9237, Latent Variable Analysis and Signal Separation : 12th International Conference, Liberec, Czech Republic.

Soni Meet H et al, Sub-band Autoencoder features for Automatic Speech Recognition, Dec. 27, 2017, 5 pages, 2017 Ninth International Conference on Advances in Pattern Recognition (ICAPR), Bangalore, India.

Zhuo Chen, Single Channel auditory source separation with neural network, May 10, 2017, 120 pages, Located Via: IEEE Xplore: Technical Literature Search, New York, US.

Maximilian Strake et al., 'Separated Noise Suppression and Speech Restoration: LSTM-Based Speech Enhancement in Two Stages', 2019 IEEE Workshop on App. of Sig. Proc. to Audio and Acous., Oct. 2019. 5 pages.

Xiang Hao et al., 'Masking and Inpainting: a Two-Stage Speech Enhancement Approach for Low SNR and Non-Stationary Noise', ICASSP 2020, 2020. 5 pages.

A. Narayanan e.a., Ideal Ratio Mask Estimation Using Deep Neural Networks for Robust SPeech Recongition, 2013 IEE International Conference on Acoustics, Speech and Signal Processing, IEEE, May 26-31, 2013, pp. 7092-7096, 5 pages.

N. Saleem e.a., On Learning Spectral Masking for Single Channel Speech Enhancement Using Feedforward and Recurrent Neural Networks, IEEE Access 8, 2020, pp. 160581-160595, 15 pages.

N. Shah e.a., Time-Frequency Masking-Based Speech Enhancement Using Convolutional Generative Adversarial Network, 2018 Asia—Pacific Signal and Information Procession Association Annaul Summit and Conference (APSIPA ASC), IEEE, Nov. 12-15, 2018, pp. 1246-1251, 6 pages.

Santiago Pascual et al., 'SEGAN: Speech Enhancement Generative Adversarial Network' arXiv:1703..09542v3 [cs.LG], 5 pages.

Y. Tu e.a. LSTM-based Iterative Mask Estimation and Post—Processing for Multi-Channel Speech Enhancement, 2017 Asia-Pacific Signal and Information Processing Association Annual Summit and Conference (APSIPA ASC), IEEE, Dec. 12-15, 2017.

* cited by examiner

ROBUSTNESS/PERFORMANCE IMPROVEMENT FOR DEEP LEARNING BASED SPEECH ENHANCEMENT AGAINST ARTIFACTS AND DISTORTION

CROSS-REFERENCE TO RELATED APPLICATION

This application is a U.S. National Stage of International Patent Application No. PCT/US2022/020790 filed Mar. 17, 2022, claims priority of International PCT Application No. PCT/CN2021/082199 filed 22 Mar. 2021, European Patent Application No. 21178178.6 filed Jun. 8, 2021 andU.S. Provisional Application 63/180,705 filed on 28 Apr. 2021, each of which is hereby incorporated by reference in its entirety.

TECHNICAL FIELD

The disclosure relates to the field of audio processing. In particular, the disclosure relates to techniques for audio enhancement (e.g., speech enhancement) using deep-learning models or systems, and to frameworks for training deep-learning models or systems for audio enhancement.

BACKGROUND

Speech enhancement aims to enhance or separate the speech signal (speech component) from a noisy mixture signal. Numerous speech enhancement approaches have been developed over the last several decades. In recent years, speech enhancement has been formulated as a supervised learning task, where discriminative patterns of clean speech and background noise are learned from training data. However, these algorithms all suffer from different processing distortions when dealing with different acoustic environments. Typical processing distortions include target loss, interference, and algorithmic artifacts.

Thus, there is a need for improved deep learning based methods of audio processing, including speech enhancement, that can reduce artifacts and/or distortion.

SUMMARY

In view of the above, the present disclosure provides a method of processing an audio signal, as well as a corresponding apparatus, computer program, and computer-readable storage medium, having the features of the respective independent claims.

According to an aspect of the disclosure, a method of processing an audio signal is provided. The method may include a first step for applying enhancement to a first component of the audio signal and/or applying suppression to a second component of the audio signal relative to the first component. The first step may be an enhancement step or a separation step that at least partially isolates the first component from any residual components of the audio signal, or that generates a mask for doing so. As such, the first step may also be said to perform a denoising operation. Enhancement of the first component may be relative to the second component. The first component may be speech (speech component), for example. The second component may be noise (noise component) or background (background component), for example. The method may further include a second step of modifying an output of the first step by applying a deep learning based model to the output of the first step, for perceptually improving the first component of the audio signal. The second step may be a modification step or an improvement step. It may result in removal of distortion and/or artifacts introduced by the first step. The second step may operate on a waveform signal with enhanced first component and/or suppressed second component, or it may operate on a mask, depending on the output of the first step.

Configured as described above, the proposed method can remove artifacts and distortion that are introduced by an audio processing step, such as a speech enhancement step (e.g., deep learning based speech enhancement step). This is achieved by means of a deep learning based model that can be specifically trained to remove the artifacts and distortion resulting from the audio processing at hand.

In some embodiments, the first step may be a step for applying speech enhancement to the audio signal. Accordingly, the first component may correspond to a speech component and the second component may correspond to a noise, background, or residual component.

In some embodiments, the output of the first step may be a waveform domain audio signal (e.g., waveform signal) in which the first component is enhanced and/or the second component is suppressed relative to the first component. As such, the first step may receive a time domain (waveform domain) audio signal and apply enhancement of the first component and/or suppression of the second component by (directly) modifying the time domain audio signal.

In some embodiments, the output of the first step may be a transform domain mask indicating weighting coefficients for individual bins or bands. The transform domain (transformed domain) may be a frequency domain or spectral domain, for example. The (transform domain) bins may be time-frequency bins. The mask may be a magnitude mask, phase-sensitive mask, complex mask, binary mask, etc., for example. Further, applying the mask to the (transform domain) audio signal may result in the enhancement of the first component and/or the suppression of the second component relative to the first component. Specifically, enhancement of the first component and/or suppression of the second component may be achieved by applying the mask to the transform domain audio signal, by removing or suppressing time-frequency tiles relating to noise or background. It is understood that the method may optionally include an (initial) step of transforming the audio signal to the transform domain and/or a (final) step for implementing the inverse transform.

In some embodiments, the second step may receive a plurality of instances of output of the first step. Therein, each of the instances may correspond to a respective one of a plurality of frames of the audio signal. Further, the second step may jointly apply the machine learning based model to the plurality of instances of output, for perceptually improving the first component of the audio signal in one or more of the plurality of frames of the audio signal. In this case, the deep learning based model of the second step may have been trained based on a plurality of instances of the output of the first step and a corresponding plurality of frames of a reference audio signal for the audio signal. Alternatively, both training and operation of the second step may proceed on a frame-by-frame basis.

In some embodiments, the second step may receive, for a given frame of the audio signal, a sequence of instances of output of the first step. Therein, each of the instances may correspond to a respective one in a sequence of frames of the audio signal. The sequence of frames may include the given frame (e.g., as the last frame thereof). For example, operation of the second step may be based on a shifting window of frames that includes the given frame. As such, the method may maintain a history of previous frames (i.e., previous with respect to the given frame) to be taken into account when generating an output for the given frame. Further, the second step may jointly apply the machine learning based model to the sequence of instances of output, for perceptually improving the first component of the audio signal in the given frame.

In some embodiments, the deep learning based model of the second step may implement an auto-encoder architecture with an encoder stage and a decoder stage. Each stage may include a respective plurality of consecutive filter layers. The encoder stage may map an input to the encoder stage to a latent space representation (e.g., code). The input to encoder stage (i.e., the output of the first step) may be the aforementioned mask, for example. The decoder stage may map the latent space representation output by the encoder stage to an output of the decoder stage that has the same format as the input to the encoder stage. The encoder stage may be said to successively reduce the dimension of the input to the encoder stage, and the decoder stage may be said to successively enhance the dimension of the input to the decoder stage back to the original dimension. Accordingly, the format of the input/output may correspond to a dimension (dimensionality) of the input/output.

In some embodiments, the deep learning based model of the second step may implement a recurrent neural network architecture with a plurality of consecutive layers. Therein, the plurality of layers may be layers of long short-term memory type or gated recurrent unit type.

In some embodiments, the deep learning based model may implement a generative model architecture with a plurality of consecutive convolutional layers. Therein, the convolutional layers may be dilated convolutional layers. The architecture may optionally include one or more skip connections between the convolutional layers.

In some embodiments, the method may further include one or more additional first steps for applying enhancement to the first component of the audio signal and/or applying suppression to the second component of the audio signal relative to the first component. Therein, the first step and the one or more additional first steps may generate mutually different (e.g., pairwise different) outputs. Otherwise, the one or more additional first steps may have the same purpose or aim as the first step. In this configuration, the second step may receive an output of each of the one or more additional first steps in addition to the output of the first step. Further, the second step may jointly apply the deep learning based model to the output of the first step and the outputs of the one or more additional first steps, for perceptually improving the first component of the audio signal. The second step may, inter alia, apply weighting and/or selection to the outputs of the first step and the one or more additional first steps, for example.

In some embodiments, the method may further include a third step of applying a deep learning based model to the audio signal for banding the audio signal prior to input to the first step. Then, the second step may modify the output of the first step by de-banding the output of the first step. The deep learning based models of the second and third steps may have been jointly trained.

In some embodiments, the second and third steps may each implement a plurality of consecutive layers with successively increasing and decreasing node number, respectively. That is to say, the second and third steps may implement an auto-encoder architecture, with the third step corresponding to the encoder (encoder stage) and the second step corresponding to the decoder (decoder stage). The first step may operate on the code (latent space representation) generated by the third step.

In some embodiments, the first step may be a deep learning based step (the first step may apply, as the second step, a deep learning based model) for enhancing the first component of the audio signal and/or suppressing the second component of the audio signal relative to the first component. For example, the first step may be a deep learning based speech enhancement step.

According to another aspect of the disclosure, an apparatus for processing an audio signal is provided. The apparatus may include a first stage for applying enhancement to a first component of the audio signal and/or applying suppression to a second component of the audio signal relative to the first component. The apparatus may further include a second stage for modifying an output of the first stage by applying a deep learning based model to the output of the first stage, for perceptually improving the first component of the audio signal.

According to another aspect, a computer program is provided. The computer program may include instructions that, when executed by a processor, cause the processor to carry out all steps of the methods described throughout the disclosure.

According to another aspect, a computer-readable storage medium is provided. The computer-readable storage medium may store the aforementioned computer program.

According to yet another aspect an apparatus including a processor and a memory coupled to the processor is provided. The processor may be adapted to carry out all steps of the methods described throughout the disclosure.

It will be appreciated that apparatus features and method steps may be interchanged in many ways. In particular, the details of the disclosed method(s) can be realized by the corresponding apparatus, and vice versa, as the skilled person will appreciate. Moreover, any of the above statements made with respect to the method(s) (and, e.g., their steps) are understood to likewise apply to the corresponding apparatus (and, e.g., their blocks, stages, units), and vice versa.

BRIEF DESCRIPTION OF DRAWINGS

Example embodiments of the disclosure are explained below with reference to the accompanying drawings, wherein FIG. 1 and FIG. 2 schematically illustrate examples of an apparatus (e.g., system or device) implementing methods of audio processing according to embodiments of the disclosure, FIG. 3 schematically illustrates an example of a processing block of the apparatus, according to embodiments of the disclosure, FIG. 4, FIG. 5, FIG. 6, and FIG. 7 schematically illustrates further examples of an apparatus implementing methods of audio processing according to embodiments of the disclosure, FIG. 8 schematically illustrates an example of a framework for employing an apparatus implementing methods of audio processing according to embodiments of the disclosure, FIG. 9 schematically illustrates yet another example of an apparatus implementing methods of audio processing according to embodiments of the disclosure.

DETAILED DESCRIPTION

Figure 1:
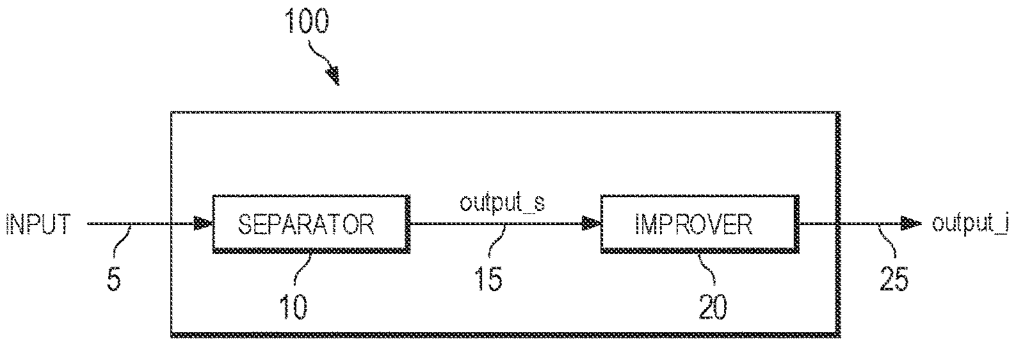

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As noted above, conventional deep learning based speech enhancement typically introduces distortion and artifacts. To alleviate this issue, this present disclosure proposed a multi-stage deep learning based speech enhancement framework capable of reducing artifacts and distortion. The framework includes two blocks, i.e., a 'separator' and an 'improver', where the separator is used to perform first round denoising and the subsequent improver aids to reduce distortion and remove artifacts introduced by the separator. In addition, the improver can also work as a 'manager' to merge and balance the output of a set of separators, for eventually outputting a comprehensive result.

Notably, while the present disclosure frequently makes reference to speech enhancement (e.g., in the first stage), it is understood that the present disclosure generally relates to any audio processing or audio enhancement in the first stage that may introduce distortion and/or artifacts, both conventional and deep learning based.

Method Overview

Speech enhancement has been recently formulated as a supervised learning task, where discriminative patterns of clean speech and background noise are learned from training data. Currently, supervised speech enhancement algorithms basically can be categorized into two groups. One group includes wave domain based models, and the other group includes transformed domain (transform domain) based models. The target of wave domain based models is essentially the clean wave, while for the transform domain based models, the target can be a bin based mask (e.g., magnitude mask, phase-sensitive mask, complex mask, binary mask, etc.) or a band based mask, depending on respective use cases. While several implementations of the present disclosure may be based on or relate to spectral domain processing, it is understood that the present disclosure is not so limited and likewise relates to waveform domain processing.

Given a mixture y (e.g., an input audio signal), which could be a mono, stereo or even a multi-channel signal, the goal of speech enhancement is to separate the target speech s (e.g., speech component) from background n (e.g., background, noise, or residual component). The noisy signal y can be modeled as $$y(k)=s[k]+n[k] \quad \text{Eq. (1)}$$

where k is the time sample index. Transforming the above model to the spectral domain (as a non-limiting example of the transform domain) yields $$Y_{m,f}=S_{m,f}+N_{m,f} \quad \text{Eq. (2)}$$

where Y, S, and N denote the time-frequency (T-F) representations of y, s and n, respectively, while m and f denote the time frame and frequency bin, respectively. The T-F representation $\hat{S}_{m,f}$ pf of the enhanced speech can be written as $$\hat{S}_{m,f} = S_{m,f} + E^{target}_{m,f} + E^{interf}_{m,f} + E^{artif}_{m,f} \quad \text{Eq. (3)}$$

where $E^{target}$ indicates the target distortion caused by the speech enhancement algorithm, while $E^{interf}$ and $E^{artif}$ are respectively the interferences (e.g., residual T-F components from noise) and artifacts (e.g., "burbling" artifacts or musical noise) error terms.

Different speech enhancement algorithms will have different kinds of distortions, which may also be correlated with noise type and signal-to-noise condition. To derive a speech enhancer that is robust against processing artifacts, the present disclosure proposes a new model framework that comprises two blocks: one 'separator' block and one 'improver' block.

FIG. 1 is a block diagram schematically illustrating an apparatus (e.g., system or device) in accordance with this model framework. The system 100 for speech enhancement (or audio enhancement/processing in general) comprises the separator block (separator) 10 and the improver block (improver) 20. An audio signal 5 (e.g., containing the aforementioned mixture y) is input to the system 100. The separator 10 implements a first stage or first step of the proposed model framework. It is used to perform first round denoising of the input audio signal 5. An output 15 of the separator 10 may relate to a modified version of the input audio signal 5 (i.e., to a waveform domain audio signal), or to a mask that can be applies to the audio signal in the transform domain, as will be described in more detail later.

The downstream improver 20 implements a second stage or second step of the model framework. It receives and operates on the output 15 of the separator 10. The improver 20 processes the output 15 of the separator 10 to reduce the target distortion, remove or suppress artifacts, and/or remove or suppress residual noise in the audio signal. The improver 20 eventually generates an output 25, which may relate to a (further) modified waveform signal or to a modified mask, as will be described in more detail below. It should be noted that the proposed framework does not relate to a concatenation of two separate models, but relates indeed to a single unified model. The separator 10 and the improver 20 are merely two (conceptual) blocks in the model.

Notably, while the separator 10 may be implemented both as a deep neural network (DNN) or by a traditional audio processing component, the improver 20 according to the present disclosure is implemented by a deep neural network, i.e., is deep learning based.

While there are many separators 10 proposed in academia and industry, the present disclosure will mainly focus on the improver 20, including potential structures and implementations, collaboration with the separator 10, and training strategies.

Figure 10:
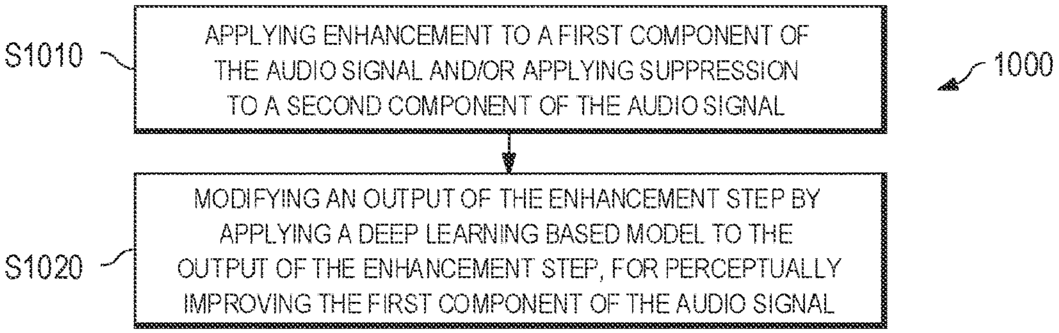
FIG. 10 is a flowchart schematically illustrating an example of a method of audio processing according to embodiments of the disclosure.

In line with the above, an example of a method 1000 of audio processing (e.g., audio enhancement, such as speech enhancement) is schematically illustrated in the flowchart of FIG. 10. Method 1000 may be a method of speech enhancement, for example. It comprises steps S1010 and S1020.

Step S1010 is a first step (e.g., enhancement step or separation step) for applying enhancement to a first component of the audio signal 5 (e.g., speech) and/or applying suppression to a second component of the audio signal 5 (e.g., noise or background). It is understood that enhancement of the first component may be relative to the second component, and/or suppression of the second component may be relative to the first component. Thereby, the first step at least partially isolates the first component from any residual components of the audio signal 5. As such, the first step may also be said to perform a denoising operation for the audio signal 5.

As noted above, the first step can be a step for applying speech enhancement to the audio signal 5. In this case, the first component is a speech component and the second component is a noise, background, or residual component, or the like.

Moreover, it is understood that the first step may be implemented both by traditional audio processing means, as well as by a deep neural network. That is, the first step may be a deep learning based step in some implementations, for enhancing the first component of the audio signal and/or suppressing the second component of the audio signal relative to the first component.

Step S1020 is a second step (e.g., modification step or improvement step) of modifying an output of the first step by applying a deep learning based model to the output of the first step, for perceptually improving the first component of the audio signal. Here, perceptual improvement may relate to (or may comprises) the removal (or at least suppression) of distortion and/or artifacts introduced by the first step, as well as possibly any remaining unwanted components (e.g., noise or background) not removed by the first step.

It is understood that step S1010 may be implemented by the aforementioned separator 10 and that step S1020 may be implemented by the aforementioned improver 20.

The first and second steps (and likewise, the separator 10 and the improver 20) may operate either in the waveform domain (i.e., directly act on a waveform signal), or in the transform domain. One non-limiting example of the transform domain is the spectral domain. In general, the transformation translating from the waveform domain to the transform domain may involve a time-frequency transform. As such, the transform domain may also be referred to as frequency domain.

When operating in the waveform domain, the first step (and likewise, the separator 10) receives a time domain (waveform domain) audio signal and applies enhancement of the first component and/or suppression of the second component relative to the first component by (directly) modifying the time domain audio signal. In this case, the output of the first step (and likewise, of the separator 10) is a waveform domain audio signal in which the first component is enhanced and/or the second component is suppressed.

When operating in the transform domain, the output of the first step (and likewise, of the separator 10) is a transform domain mask (e.g., bin based mask or band based mask) indicating weighting coefficients for individual bins or bands of the audio signal. Applying this mask to the (transform domain) audio signal would then result in the enhancement of the first component and/or the suppression of the second component relative to the first component. The (transform domain) bins may be time frequency bins, for example. Moreover, the mask may be a magnitude mask, phase-sensitive mask, complex mask, binary mask, etc., for example. It is understood that the method 1000 may optionally comprise an (initial) step of transforming the audio signal to the transform domain and/or a (final) step for implementing the inverse transform. Analogously, the apparatus described in the present disclosure may include a transform stage and an inverse transform stage.

Returning to FIG. 1, the improver 20 receives the output 15 of the separator 10 as input. It can take either the output of a single frame or the output of multiple frames from the separator 10.

For the first option, the improver 20 (and likewise, the second step) can work on the single output of the separator 10, as shown in FIG. 1. For example, if the output 15 of the separator 10 is a mask for one frame, the improver 20 would be trained based on this single-frame mask. Therein, the separator 10 (if implemented by a deep neural network) and the improver 20 can be trained at the same time (i.e., simultaneously), or the two-stage training strategy set out below of first training the separator 10 and then training the improver 20 could be followed. In general, it can be said that for the first option, both training and operation of the second step (and likewise, of the improver) may proceed on a frame-by-frame basis.

Figure 2:
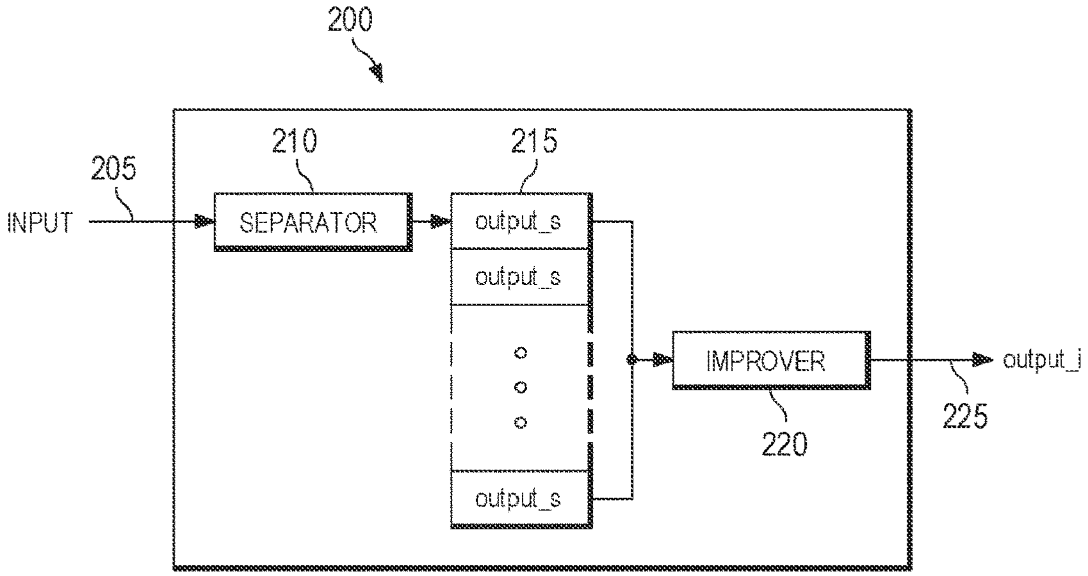

For the second option, the improver 220 (and likewise, the second step) can work on multiple outputs 215 of the separator 210. This situation is schematically illustrated in FIG. 2. For example, the output 215 of the separator 210 may be a mask of one frame, and the improver 220 may be trained based on several outputs 215 of the separator 210. In other words, the output 215 of the separator 210 may be sequenced/accumulated until a large enough number of frames are available. Then, these multiple outputs 215 of the separator 210 may be fed into the improver 220 for training. When working with this option, the separator 210 (if implemented by a deep neural network) may be trained first.

In line with the above, it can be said that for the second option the second step (and likewise, the improver) receives a plurality of instances of output of the first step (and likewise, of the separator). Each of the instances corresponds, for example, to a respective one of a plurality of frames of the audio signal. Further, each instance may correspond to a mask for one frame, or to one frame of audio. Then, the second step jointly applies the machine learning based model to the plurality of instances of output, for perceptually improving the first component of the audio signal in one or more of the plurality of frames of the audio signal. As noted above, the deep learning based model of the second step may have been trained based on a plurality of instances of the output of the first step and a corresponding plurality of frames of a reference audio signal for the audio signal.

In another implementation of the second step, operation and training of the second step may be based on a shifting window of frames including a given frame. As such, the method may maintain a history of previous frames to be taken into account when generating an output for the given frame. Specifically, in this implementation the second step receives, for processing the given frame of the audio signal, a sequence of instances of output of the first step, where each of the instances corresponds to a respective one in a sequence of frames of the audio signal. It is understood that the sequence of frames includes the given frame. Then, the second step jointly applies the machine learning based model to the sequence of instances of output, for perceptually improving the first component of the audio signal in the given frame. The given frame may be the most recent frame in the sequence of frames, for example.

Improver Network Structure

The improver network should depend on the design of the separator and should specifically ensure that the output of the separator matches the input of the improver. Moreover, the improver should also be designed based on the specific issues of the separator that need to be addressed (e.g., distortion, artifacts, etc.). A wide range of implementations are available for the improver. The following implementations have been found to be advantageous for the purposes at hand: 1) an auto-encoder (AE) structure with a bottleneck layer to generate a smooth soft-mask in the frequency domain, 2) a recurrent neural network (RNN)/long short-term memory (LSTM) model enabling output of temporally smooth results, and 3) a generative model for recovering missing harmonics in the separator component.

Auto-Encoder Based Improver

Figure 3:
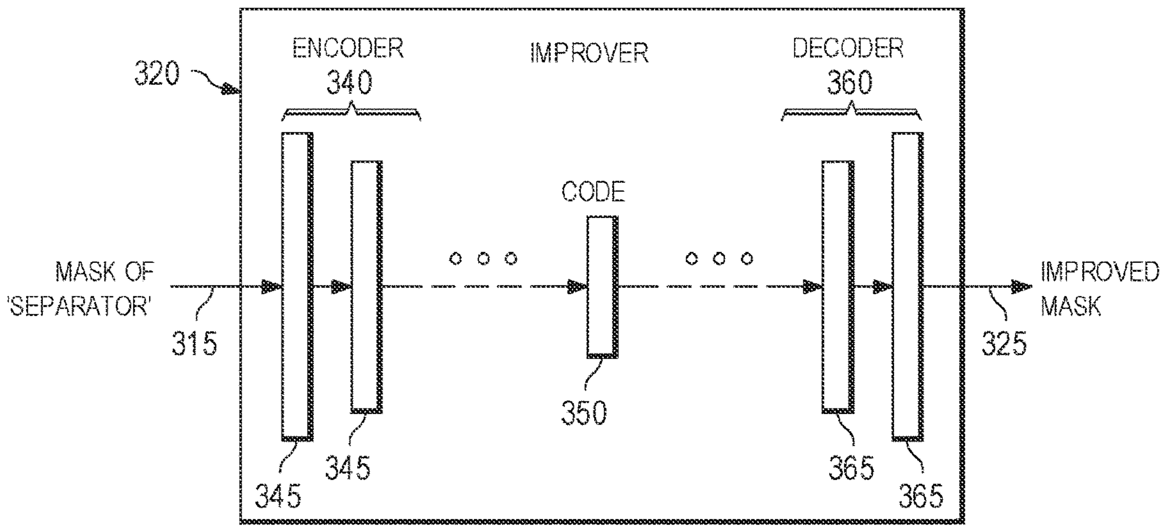

Most spectral domain based speech enhancement algorithms suffer from artifacts caused by discontinuous masks, strong/instable residual noise under low SNR conditions, and residual noise within non-dialog segments. To address these problems, the present disclosure proposes the AE based improver schematically shown FIG. 3. Accordingly, the deep learning based model implementing the improver (or the second step, for that matter) comprises an auto-encoder architecture. The auto-encoder structure has an encoder stage (or encoder) 340 and a decoder stage (or decoder) 360. Each of the encoder 340 and the decoder 360 comprises a respective plurality of consecutive filter layers 345, 365. The encoder 340 maps an input 315 thereto to a latent space representation 350. The last layer of the encoder 340 may be referred to as a bottleneck layer. The output of the bottleneck layer is the aforementioned latent space representation 350. The decoder 360 maps the latent space representation 350 output by the encoder 340 back to the initial format, i.e., to an output of the decoder 325 that has the same format as the input 315 to the encoder 340. Thus, the encoder 340 may be said to successively (i.e., from one layer to the next) reduce the dimension of its input 315, and the decoder 360 may be said to successively enhance the dimension of its input (i.e., the latent space representation 350) back to the original dimension. Accordingly, the format of the input/output may correspond to a dimension (dimensionality) of the input/output. The input 315 to encoder 340 (i.e., the output of the first step) may be the aforementioned mask and the output 325 of the decoder 360 may be an improved mask, for example.

In one example, the encoder 340 comprises a plurality of consecutive layers 345 (e.g., DNN layers) with successively decreasing node number, and the decoder 360 also comprise a plurality of consecutive layers 365 (e.g., DNN layers) with successively increasing node number. For example, the encoder 340 and the decoder 360 may have the same number of layers, the outermost layer of the encoder 340 may have the same number of nodes as the outermost layer of the decoder 360, the next-to-outermost layer of the encoder 340 may have the same number of nodes as the next-to-outermost layer of the decoder 360, and so forth, up to respective innermost layers.

In such an auto-encoder structure, the encoder learns efficient data representations (i.e., latent space representations) of the mask estimated by the separator (as a non-limiting example of the output of the separator) to remove 'mask noise', and the decoder generates an improved mask from the latent representation space, by mapping back to the initial space. The improved mask can be smoother and have less artifacts due to the mask compression conducted by the encoder. Moreover, such mask reconstruction by an AE based improver will also help to fix speech distortion and have a better discrimination between speech and noise, where the better discrimination will help to remove most of the residual noise within the non-speech segments.

Figure 4:
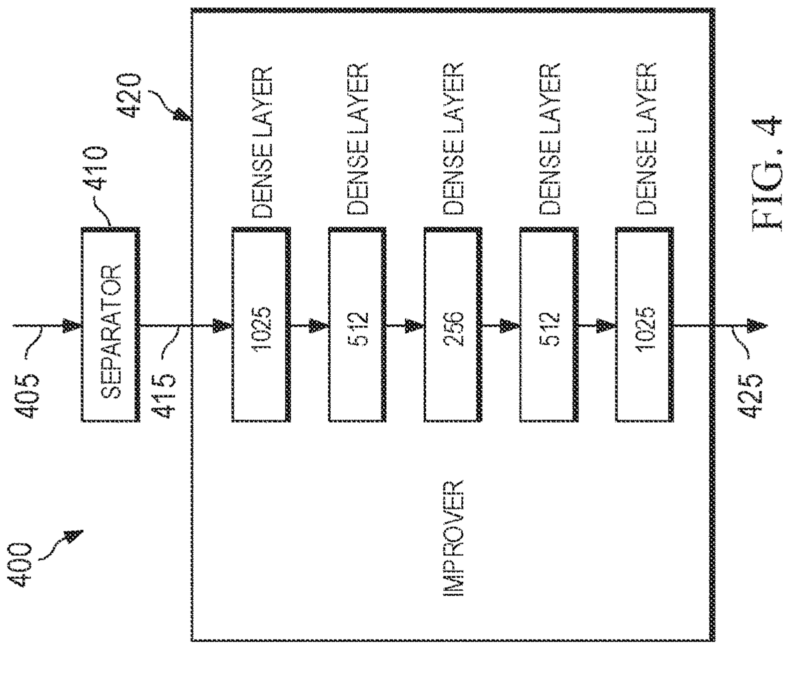

A specific non-limiting example of an AE based implementation of the improver 420 is schematically illustrated in FIG. 4. The separator 410 in this example is implemented by a multi-scale convolutional neural network working over the T-F domain. For a 48 kHz audio signal 405, the input is transformed to the T-F domain by using 4096 short time Fourier transforms (STFT) with a 50% overlap. Then the 2049-point magnitude is grouped into 1025 bands. Eight frames are fed to the separator 410 (i.e., the input dimension is 8×1025), and the target is a magnitude mask of one frame (i.e., dimension 1×1025). The AE based improver 420 is implemented using a series of DNN layers (e.g., with 512, 256, 512, and 1025 nodes, respectively). The encoder of the AE structure learns 256-dimensional representations of the mask, and the decoder reconstructs the improved 1025-dimensional mask by using these 256-dimensional representations. It has been found that such an improver can fix at least part of the target distortion, can further remove at least part of the residual noise, and can alleviate at least part of the audible artifacts. Generally, the perceptual quality is significantly improved by the AE based improver.

Recurrent Neural Network Based Improver

In view of the temporal discontinuity of some frame based speech enhancement algorithms, the improver may be implemented using a RNN based architecture that uses multiple outputs of the separator.

Figure 5:
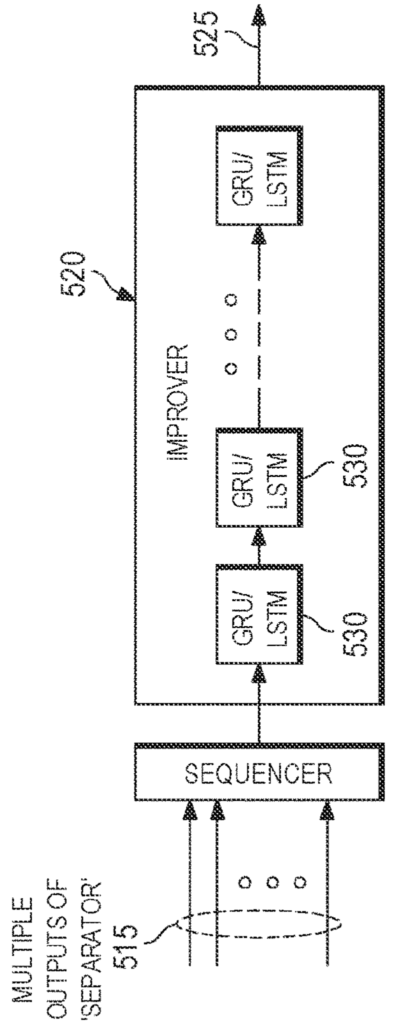

An example of such implementation is schematically illustrated in FIG. 5. The separator may be the same as for the AE based implementation, for example. The improver 520 comprises a plurality of consecutive layers. In the example, these layers are gated recurrent unit (GRU)/LSTM layers. The separator 520 may have been trained first, for example with eight frames as input. At runtime, the separator is fed with 32 blocks, with each block comprising eight frames and a frame-shift of one frame (so that altogether 39 frames are fed to the separator 510). The separator 510 processes 32 blocks and outputs the results of 32 frames accordingly. These 32-frame results are then fed it into the improver 520 as the input. The GRU/LSTM based improver 520 operates on the outputs 515 of the separator and help to improve speech quality and consistency. The nodes of the GRU/LSTM output layer can be chosen to generate the final result. For example, a one-frame output based on 32 history frames can be chosen, or it can be chosen to generate 32 frames output at a time.

In general, the deep learning based model of the improver (and likewise, the second step) may implement a recurrent neural network architecture with a plurality of consecutive layers. Therein, the plurality of layers may be layers of long short-term memory type or gated recurrent unit type.

Generative Model Based Improver

It has been found that mask based methods often perform well to separate the dominant harmonic components in noisy speech, but may not perform well on those speech components that are masked/degraded by noise. Using a generative model, such as waveNet or SampleRNN, for example, may be able to reconstruct those missing speech components.

Figure 6:
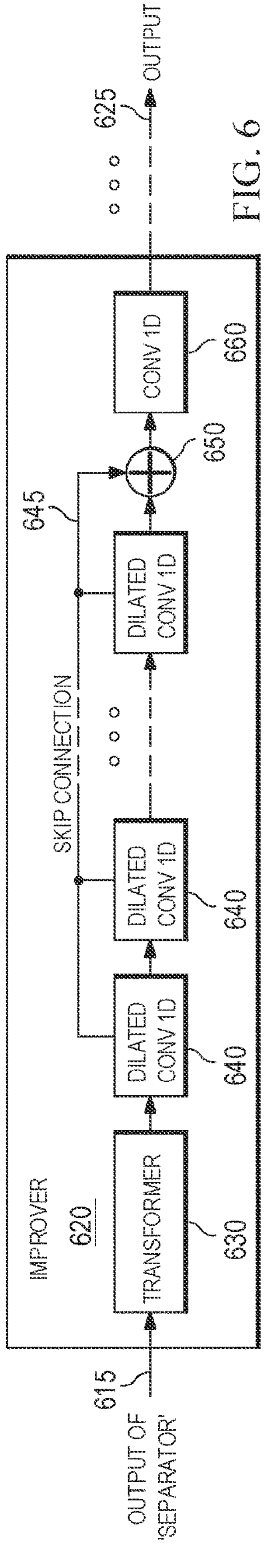

An example of an implementation of the improver using a generative model is schematically illustrated in FIG. 6. In the example, a transformer 630 (or ISTFT) is optionally added to transform the output 615 of the separator to the waveform domain, if necessary. The improver 620 then uses a series of 1-D dilated convolutionally layers 640 with a skip connection 645 followed by a 1-D convolutional layer 660 to generate a modified audio signal 625 (e.g., modified dialog signal). It may recover the degraded speech components caused by the separator and may also help to remove the residual noise that cannot be removed by the separator.

In general, the deep learning based model of the improver (and likewise, the second step) may implement a generative model architecture with a plurality of consecutive convolutional layers. Therein, the convolutional layers may be dilated convolutional layers, optionally comprising one or more skip connections.

Training Strategy

The present disclosure proposes two alternative training strategies for the separator-improver framework described herein. Therein, it is assumed that the separator and the improver each comprise or implement a deep learning based model, and that training the separator/improver corresponds to training their respective deep learning based models.

The first training strategy is a two-stage training strategy. At a first training stage, the separator is trained, and its corresponding loss will be optimized via back propagation. Once the separator has been trained, all its parameters are fixed (i.e., untrainable), and the output of the trained separator will be fed into the improver. At a second training stage, only the parameters of the improver are trained, and the loss function of the improver is optimized via back propagation. As such, the whole framework can be used as an entire model while the separator and the improver are trained in two training stages separately. In other words, the improver can be regarded as a deep learning based customized post-processing block for the separator, which can generally improve the performance of the separator.

According to the second training strategy, the separator and the improver can be trained at the same time (i.e., simultaneously). A challenge and important issue in doing so may be to ensure that each of the separator and the improver performs its respective own function, i.e., the separator is expected to extract the speech signal and the improver is expected to improve the performance of the separator. In order to achieve this goal, a 'constrained' training strategy is proposed, in which the loss function used for training not only considers the final output of the improver, but also the intermediate output of the separator. The loss function used for training may be a common loss function for both the deep learning based model of the separator and the deep learning model of the improver (respectively applied in the first step and second step of the corresponding processing method). That is, the loss function is based on both the output of the separator and the output of the improver, in addition to appropriate reference data. By considering both the separator loss and the improver loss, the separator can be trained towards dialog separation (or any desired audio processing function in general), and convergence of the improver will be improved since the output of the separator also converges towards the final goal.

Method Extensions

Next, generalizations, extensions, and modifications of the aforementioned apparatus and methods will be described.

Multiple Separators

Figure 7:
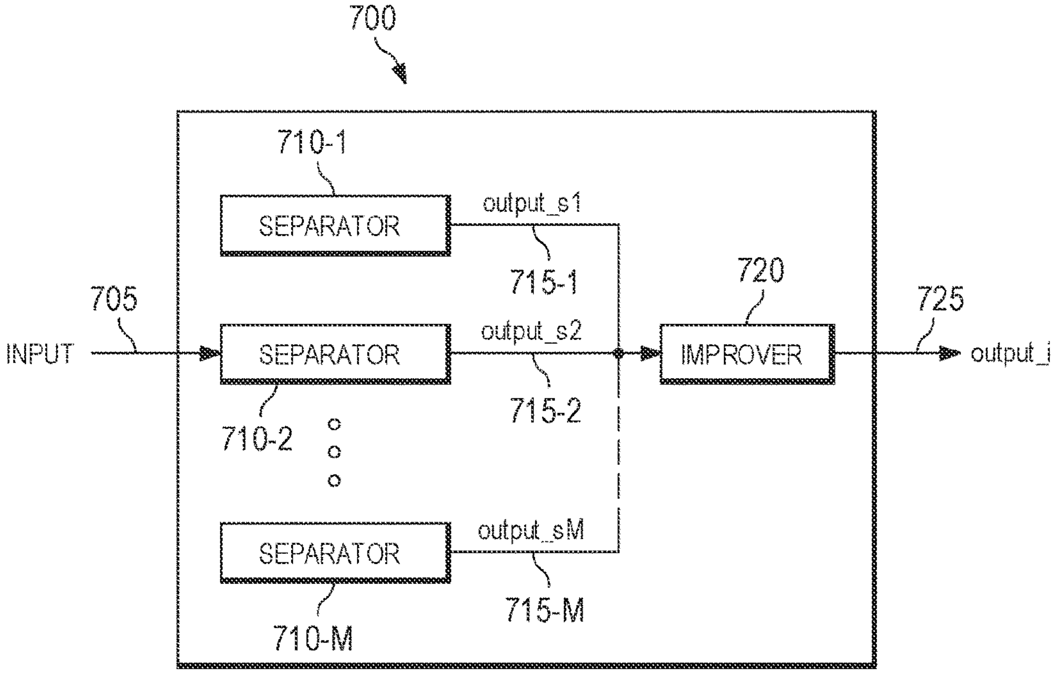

A number of supervised speech enhancement algorithms have been developed in the past, each with its own advantages and disadvantages. For example, some methods can work well over stationary noise, while others may work well over non-stationary noise. It is hard to achieve ideal performance for all use cases with only one model of speech enhancement. Therefore, the present disclosure proposes to combine multiple enhancers (i.e., separators) in the framework at hand, as schematically illustrated in FIG. 7. The system 700 in this implementation comprises a plurality of separators 710-1, . . . , 710-M that generate respective outputs output_s1, 715-1 to output_sM, 715-M. The improver 720 receives these outputs and may act as a 'manager' and fine tune its performance by comparing and integrating the outputs 715-1, 715-2, . . . 715-M of the separators 710-1, . . . , 710-M. Finally, the improver 720 may obtain an aggregated output 725 by reconstructing and weighting the outputs 715-1, 715-2, . . . 715-M of all the separators 710-1, . . . , 710-M, based on a multi-to-one mapping learned during training.

In general, the above method of audio processing may further comprise one or more additional first steps for applying enhancement to the first component of the audio signal and/or applying suppression to the second component of the audio signal relative to the first component. Therein, the first step described above and the one or more additional first steps generate mutually (e.g., pairwise) different outputs. For instance, these steps may use different models of audio processing (e.g., speech enhancement), and/or different model parameters. Then, the second step receives a respective output of each of the one or more additional first steps in addition to the output of the first step, and jointly applies its deep learning based model to the output of the first step and the outputs of the one or more additional first steps, for perceptually improving the first component of the audio signal. The second step may, inter alia, apply weighting and/or selection to the outputs of the first step and the one or more additional first steps, for example. It is understood that these considerations analogously apply to an apparatus (e.g., system or device), that comprises, in addition to the separator and the improver, one or more additional separators.

Traditional Speech Enhancement with Deep Learning Based Improver

Figure 8:
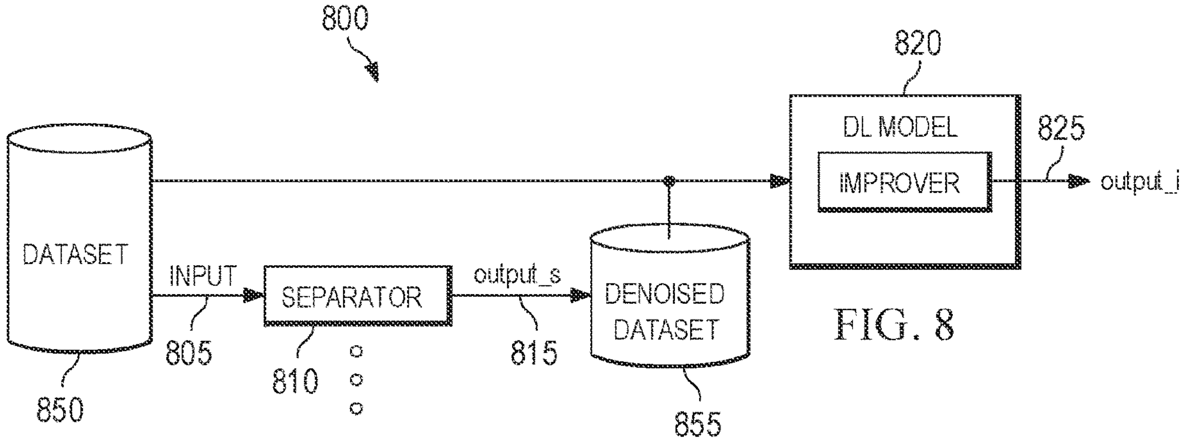

A deep learning model structure comprising a separator and an improver has been proposed above. Traditional (e.g., not deep learning based) speech enhancement algorithms cannot be directly embedded into a deep learning model. To derive a speech enhancer that is robust against artifacts introduced by traditional methods, the present disclosure proposes a modified framework, as shown in FIG. 8. This framework comprises a traditional speech enhancement algorithm together with a deep learning based improver.

As can be seen from FIG. 8, a new training strategy can be resorted to for enabling use of traditional methods as the separator in the proposed framework. Specifically, one or a set of different traditional speech enhancement algorithms can be used, and each of a plurality of noisy signals in a training set 850 can be used as input 805 for processing by each of these algorithms (e.g., separator(s) 810). Subsequently, all the enhanced speech signals 815 as well as the original unprocessed noisy speech signals are collected to form a new comprehensive training set 855, which is then used to train the deep learning based improver 820, which generates output 825. Therein, an unprocessed noisy signal and its multiple enhanced versions correspond to the same target speech signal. In other words, the improver 820 tends to learn a many-to-one mapping. As one implementation, the traditional methods can be spectral subtraction or a Wiener filter based on priori SNR estimation etc., for example.

Improver Used for Intelligent Banding

From another point of view, the auto-encoder based improver described above can also be considered as relating to banding and de-banding processing. In a typical signal processing algorithm, more T-F characteristics will be retained for higher band number, but banding may still be necessary for reducing the processing complexity. However, there are many cases where an acceptable performance cannot be achieved by using limited bands when using traditional banding algorithms (e.g., octave band, one-third octave band, etc.). Moreover, it is difficult to assess beforehand which band number should be used in order to achieve a good trade-off between complexity and accuracy.

Figure 9:
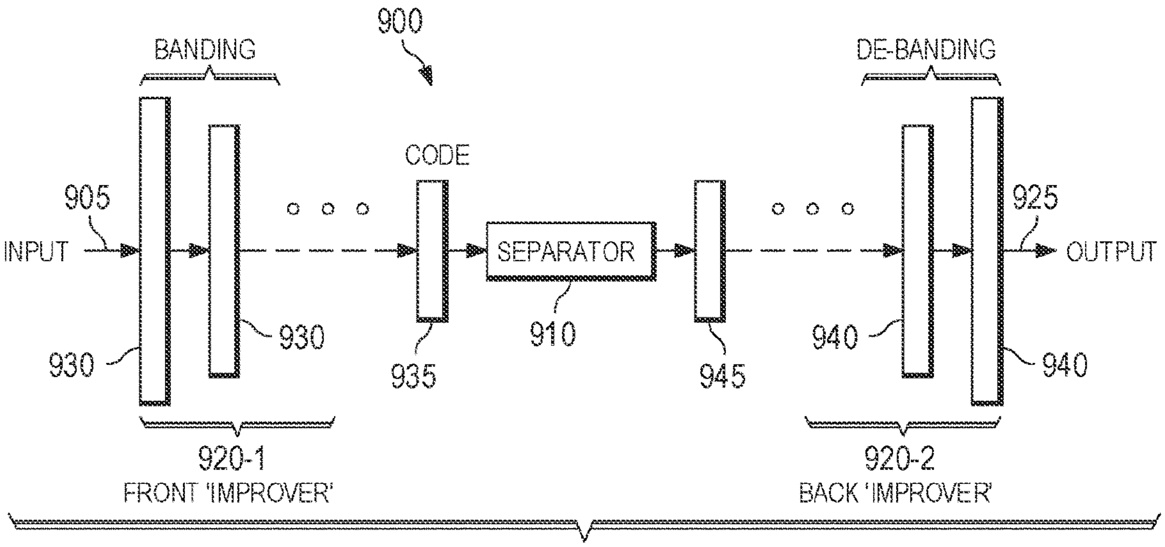

Regarding the first issue, the aforementioned auto-encoder based improver can be used for implementing an automatic banding scheme. The corresponding framework is schematically illustrated in FIG. 9. As such, the improver is split into two parts, a first (front) part 920-1 for receiving an input 905 (e.g., an input audio signal) and automatic banding thereof, and a second (back) part 920-2 for automatic de-banding. Other than the splitting, the same considerations as made above for the auto-encoder based improver also apply here. That is, the front improver 920-1 may comprise a plurality of consecutive layers 930 (e.g., DNN layers) with successively decreasing node number that eventually map to a latent space representation 935 (code), and the back improver 920-2 may also comprise a plurality of consecutive layers 940 (e.g., DNN layers) with successively increasing node number. For example, front and back improvers 920-1, 920-2 may have the same number of layers, the outermost layer of the front improver 920-1 may have the same number of nodes as the outermost layer of the back improver 920-2, the next-to-outermost layer of the front improver 920-1 may have the same number of nodes as the next-to-outermost layer of the back improver 920-2, and so forth, up to respective innermost layers. The separator 910 can be trained based on the intelligent band feature learned by the front improver to obtain the denoised band features. Then the denoised band features (i.e., latent space representation 945) are fed into the back improver for de-banding processing, which will eventually yield a bin-based output 925.

Regarding the second issue, the dimension of the code (e.g., latent representation) in the front improver (i.e., output by the front improver) can be modified to determine the most proper band number. By modifying the dimension of the latent representation, the performance for different band numbers can be assessed. Accordingly, the most appropriate band number can be selected to provide a good trade-off between complexity and accuracy.

As one example implementation, a series of DNN layers (e.g., with 512 and 256 nodes, respectively) can be used for the front improver 920-1 to group a 1025-point spectral magnitude (obtained by a 2048-point STFT with 50% overlap) and obtain a 256-dimensional band feature. For the back improver 920-2, DNN layers with reverse node number assignment as compared to the front improver 920-1 (e.g., 256 and 512 nodes, respectively) can be used. The back improver 920-2 will eventually reconstruct the bin based output (e.g., the bin based mask) based on the output of the separator (e.g., denoised band features).

In general, starting for example from method 1000 in FIG. 10, the aforementioned method of audio processing may further comprise a third step of applying a deep learning based model to the audio signal for banding the audio signal. The third step is to be performed before the first step, so that the order of steps is third step—first step—second step. The second step modifies the output of the first step by de-banding the output of the first step. In this configuration, the third and second steps implement an auto-encoder structure for banding and de-banding. They may be said to be based on a single deep learning based model, or alternatively, it may be said that their deep learning based models have been jointly trained. As noted above, the second and third steps may each implement a plurality of consecutive layers with successively increasing and decreasing node number, respectively.

Figure 11:
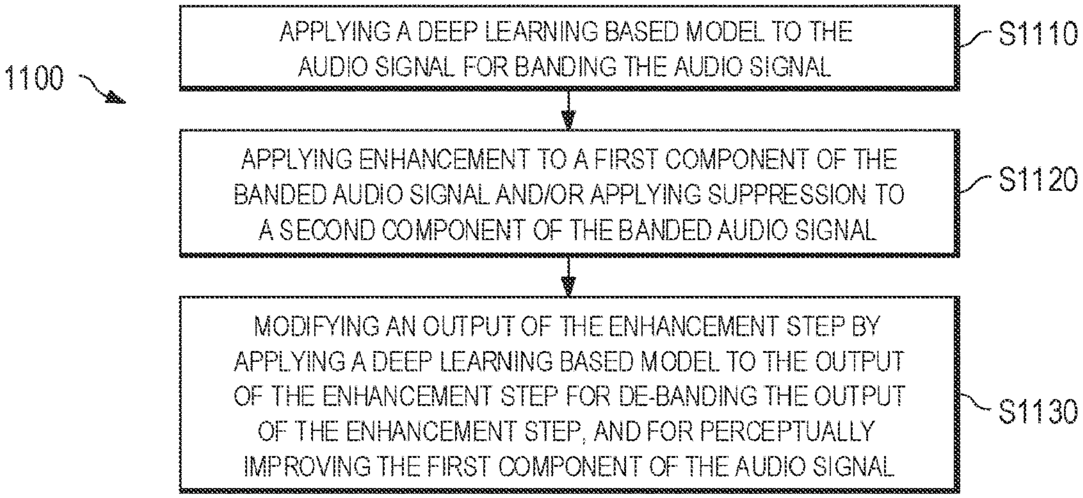
FIG. 11 is a flowchart schematically illustrating another example of a method of audio processing according to embodiments of the disclosure.

In line with the above, an example of a method 1100 of audio processing (e.g., audio enhancement, such as speech enhancement) using intelligent banding is schematically illustrated in the flowchart of FIG. 11. Method 1100 may be a method of speech enhancement, for example. It comprises steps S1110 through S1130.

At step S1110, a deep learning based model is applied to the audio signal for banding the audio signal.

At step S1120, enhancement is applied to a first component of the banded audio signal and/or suppression relative to the first component is applied to a second component of the banded audio signal relative to the first component.

At step S1130, an output of the enhancement step is modified by applying a deep learning based model to the output of the enhancement step for de-banding the output of the enhancement step, and for perceptually improving the first component of the audio signal.

It is understood that the above general considerations for the method of audio processing analogously apply to an apparatus (e.g., system or device) for audio processing.

Generalization to General Two-Stage Neural Networks

As described above, the second stage in the proposed framework for audio processing may be an improver for removing artifacts and fixing speech distortion. However, the second stage could also have other functionalities, such as implementing a voice activity detector (VAD), for example. Taking the VAD algorithm as an example, all known VAD algorithms may have a degraded accuracy when there is strong noise. It is very challenging for these algorithms to show robust performance in the presence of various noise types and/or for low SNR in general. With the proposed framework, the separator can be used to denoise the mixture (i.e., the input audio signal), and the improver can be used to perform VAD. Such a VAD system can internally perform the denoising and thus will be more robust with respect to complicated (e.g., noisy) scenarios.

Thus, the aforementioned improver may be replaced by an improver that performs deep learning based VAD on the output of the separator, in addition to or as an alternative to removing distortion and/or artifacts, etc.

Moreover, the proposed two-step training scheme can be generalized to a number of other speech enhancement based applications, such as equalizers or intelligibility meters, for example. The separator may perform speech enhancement as described above and remove the background, and the improver may be trained based on specific requirements. This can achieve more robust and better results compared to the results when only using the original noisy input of the separator. Accordingly, the improver can be specifically adapted so that the separator and the improver jointly achieve the desired application/operation, such as equalizers or intelligibility meters, for example.

Generalization to Multi-Stage Neural Networks in Audio Processing Chains

A mature audio signal processing technology chain typically includes several modules (e.g., audio processing modules), some of which may use traditional signal processing methods, and some of which may be based on deep learning. These modules are typically cascaded in series to get the desired final output. Based on the proposed framework, each module or part of the module in such signal processing chain can be embedded into a large deep learning based model. When training, each module can be trained in turn (i.e., separately and in sequence) and its output can be supervised to meet the desired outcome, up to the end of the last module training. The whole model will become a chain of audio processing technologies based on deep learning, and the modules will work together as expected in the model.

That being said, the present disclosure also relates to any pairing of a signal processing module (e.g., adapted to perform audio processing, audio enhancement, etc.), followed by a deep learning based improver, trained to improve the output of the signal processing module. Improving the output of the signal processing module may include one or more of removing artifacts, removing distortion, and/or removing noise.

Example Computing Device

A method of audio processing (e.g., speech enhancement) has been described above. Additionally, the present disclosure also relates to an apparatus (e.g., system or device) for carrying out this method. An example of such apparatus is shown in FIG. 1. Moreover, in line with the method 1000 illustrated in FIG. 10, an apparatus for processing an audio signal according to the present disclosure can be said to comprise a first stage and a second stage. The first and second stages may be implemented in hardware and/or software. The first stage is adapted for applying enhancement to a first component of the audio signal and/or applying suppression to a second component of the audio signal. The second stage is adapted for modifying an output of the first stage by applying a deep learning based model to the output of the first stage, for perceptually improving the first component of the audio signal. Other than that, any of the considerations made above may apply to the first and second stages.

In general, the present disclosure relates to an apparatus comprising a processor and a memory coupled to the processor, wherein the processor is adapted to carry out the steps of the method(s) described herein. For example, the processor may be adapted to implement the aforementioned first and second stages.

These aforementioned apparatus (and their stages) may be implemented by a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that apparatus. Further, while only a single apparatus 1400 is illustrated in the figures, the present disclosure shall relate to any collection of apparatus that individually or jointly execute instructions to perform any one or more of the methodologies discussed herein.

The present disclosure further relates to a program (e.g., computer program) comprising instructions that, when executed by a processor, cause the processor to carry out some or all of the steps of the methods described herein.

Yet further, the present disclosure relates to a computer-readable (or machine-readable) storage medium storing the aforementioned program. Here, the term "computer-readable storage medium" includes, but is not be limited to, data repositories in the form of solid-state memories, optical media, and magnetic media, for example.

Interpretation and Additional Configuration Considerations

The present disclosure relates to methods of audio processing and apparatus (e.g., systems or devices) for audio processing. It is understood that any statements made with regard to the methods and their steps likewise and analogously apply to the corresponding apparatus and their stages/blocks/units, and vice versa.

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE1. A method of processing an audio signal, comprising:

a first step for applying enhancement to a first component of the audio signal and/or applying suppression to a second component of the audio signal relative to the first component; and a second step of modifying an output of the first step by applying a deep learning based model to the output of the first step, for perceptually improving the first component of the audio signal.

EEE2. The method according to EEE 1, wherein the first step is a step for applying speech enhancement to the audio signal.

EEE3. The method according to EEE 1 or 2, wherein the output of the first step is a waveform domain audio signal in which the first component is enhanced and/or the second component is suppressed relative to the first component.

EEE4. The method according to EEE 1 or 2, wherein the output of the first step is a transform domain mask indicating weighting coefficients for individual bins or bands, and wherein applying the mask to the audio signal results in the enhancement of the first component and/or the suppression of the second component relative to the first component.

EEE5. The method according to any one of EEEs 1 to 4, wherein the second step receives a plurality of instances of output of the first step, each of the instances corresponding to a respective one of a plurality of frames of the audio signal, and wherein the second step jointly applies the machine learning based model to the plurality of instances of output, for perceptually improving the first component of the audio signal in one or more of the plurality of frames of the audio signal.

EEE6. The method according to any one of EEEs 1 to 5, wherein the second step receives, for a given frame of the audio signal, a sequence of instances of output of the first step, each of the instances corresponding to a respective one in a sequence of frames of the audio signal, the sequence of frames including the given frame, and wherein the second step jointly applies the machine learning based model to the sequence of instances of output, for perceptually improving the first component of the audio signal in the given frame.

EEE7. The method according to any one of EEEs 1 to 6, wherein the deep learning based model of the second step implements an auto-encoder architecture with an encoder stage and a decoder stage, each stage comprising a respective plurality of consecutive filter layers, and wherein the encoder stage maps an input to the encoder stage to a latent space representation, and the decoder stage maps the latent space representation output by the encoder stage to an output of the decoder stage that has the same format as the input to the encoder stage.

EEE8. The method according to any one of EEEs 1 to 6, wherein the deep learning based model of the second step implements a recurrent neural network architecture with a plurality of consecutive layers, wherein the plurality of layers are layers of long short-term memory type or gated recurrent unit type.

EEE9. The method according to any one of EEEs 1 to 6, wherein the deep learning based model implements a generative model architecture with a plurality of consecutive convolutional layers.

EEE10. The method according to EEE 9, wherein the convolutional layers are dilated convolutional layers, optionally comprising skip connections.

EEE11. The method according to any one of EEEs 1 to 10, further comprising one or more additional first steps for applying enhancement to the first component of the audio signal and/or applying suppression to the second component of the audio signal, the first step and the one or more additional first steps generating mutually different outputs;

wherein the second step receives an output of each of the one or more additional first steps in addition to the output of the first step; and wherein the second step jointly applies the deep learning based model to the output of the first step and the outputs of the one or more additional first steps, for perceptually improving the first component of the audio signal.

EEE12. The method according to any one of the preceding EEEs, further comprising a third step of applying a deep learning based model to the audio signal for banding the audio signal prior to input to the first step;

wherein the second step modifies the output of the first step by de-banding the output of the first step; and wherein the deep learning based models of the second and third steps have been jointly trained.

EEE13. The method according to EEE 12, wherein the second and third steps each implement a plurality of consecutive layers with successively increasing and decreasing node number, respectively.

EEE14. The method according to any one of EEEs 1 to 13, wherein the first step is a deep learning based step for enhancing the first component of the audio signal and/or suppressing the second component of the audio signal relative to the first component.

EEEE15. An apparatus for processing an audio signal, comprising:

a first stage for applying enhancement to a first component of the audio signal and/or applying suppression to a second component of the audio signal relative to the first component; and a second stage for modifying an output of the first stage by applying a deep learning based model to the output of the first stage, for perceptually improving the first component of the audio signal.

EEE16. An apparatus comprising a processor and a memory coupled to the processor, wherein the processor is adapted to carry out the steps of the method according to any one of EEEs 1 to 14.

EEE17. A computer program comprising instructions that when executed by a computing device cause the computing device to carry out the steps of the method according to any one of EEEs 1 to 14.

EEE18. A computer-readable storage medium storing the computer program according to EEE 17.

The invention claimed is:

1. A method of processing an audio signal, comprising:

a first step for applying enhancement to a first component of the audio signal and/or applying suppression to a second component of the audio signal relative to the first component, wherein an output of the first step is an initial transform domain mask indicating weighting coefficients for individual bins or bands, and wherein applying the initial transform domain mask to the audio signal results in the enhancement of the first component and/or the suppression of the second component relative to the first component; and a second step of modifying the output of the first step by applying a deep learning based model to the output of the first step, for perceptually improving the first component of the audio signal by removing artifacts and/or distortions introduced in the audio signal by the first step, wherein the deep learning model generates an improved mask relative to the initial transform domain mask by taking, as input, the initial transform domain mask and generating the improved mask that removes mask noise present in the initial transform domain mask.

2. The method according to claim 1, wherein the first step is a step for applying speech enhancement to the audio signal.

3. The method according to claim 1, wherein the second step receives a plurality of instances of output of the first step, each of the instances corresponding to a respective one of a plurality of frames of the audio signal, and wherein the second step jointly applies the machine learning based model to the plurality of instances of output, for perceptually improving the first component of the audio signal in one or more of the plurality of frames of the audio signal.

4. The method according to claim 1, wherein the second step receives, for a given frame of the audio signal, a sequence of instances of output of the first step, each of the instances corresponding to a respective one in a sequence of frames of the audio signal, the sequence of frames including the given frame, and wherein the second step jointly applies the machine learning based model to the sequence of instances of output, for perceptually improving the first component of the audio signal in the given frame.

5. The method according to claim 1, wherein the deep learning based model of the second step implements an auto-encoder architecture with an encoder stage and a decoder stage, each stage comprising a respective plurality of consecutive filter layers, and wherein the encoder stage maps an input to the encoder stage to a latent space representation, and the decoder stage maps the latent space representation output by the encoder stage to an output of the decoder stage that has the same format as the input to the encoder stage.

6. The method according to claim 1, wherein the deep learning based model of the second step implements a recurrent neural network architecture with a plurality of consecutive layers, wherein the plurality of layers are layers of long short-term memory type or gated recurrent unit type.

7. The method according to claim 1, wherein the deep learning based model implements a generative model architecture with a plurality of consecutive convolutional layers.

8. The method according to claim 7, wherein the convolutional layers are dilated convolutional layers, optionally comprising skip connections.

9. The method according to claim 1, further comprising one or more additional first steps for applying enhancement to the first component of the audio signal and/or applying suppression to the second component of the audio signal, the first step and the one or more additional first steps generating mutually different outputs;

wherein the second step receives an output of each of the one or more additional first steps in addition to the output of the first step; and wherein the second step jointly applies the deep learning based model to the output of the first step and the outputs of the one or more additional first steps, for perceptually improving the first component of the audio signal.

10. The method according to claim 1, further comprising a third step of applying a deep learning based model to the audio signal for banding the audio signal prior to input to the first step;

wherein the second step modifies the output of the first step by de-banding the output of the first step; and wherein the deep learning based models of the second and third steps have been jointly trained.

11. The method according to claim 10, wherein the second and third steps each implement a plurality of consecutive layers with successively increasing and decreasing node number, respectively.

12. The method according to claim 1, wherein the first step applies a deep learning based model for enhancing the first component of the audio signal and/or suppressing the second component of the audio signal relative to the first component.

13. The method according to claim 12, wherein the deep learning models of the first step and second step are trained separately via back propagation.

14. The method according to claim 12, wherein the deep learning models of the first step and second step are trained simultaneously using a common loss function.

15. An apparatus for processing an audio signal, comprising:

a first stage for applying enhancement to a first component of the audio signal and/or applying suppression to a second component of the audio signal relative to the first component, wherein an output of the first stage is an initial transform domain mask indicating weighting coefficients for individual bins or bands, and wherein applying the initial transform domain mask to the audio signal results in the enhancement of the first component and/or the suppression of the second component relative to the first component; and a second stage for modifying the output of the first stage by applying a deep learning based model to the output of the first stage, for perceptually improving the first component of the audio signal by removing artifacts and/or distortions introduced in the audio signal by the first stage, wherein the deep learning model generates an improved mask relative to the initial transform domain mask by taking, as input, the initial transform domain mask and generating the improved mask that removes mask noise present in the initial transform domain mask.

16. A non-transitory computer-readable medium comprising instructions that, when executed by a computing device, cause the computing device to carry out the steps of the method according to claim 1.

17. The method of claim 1, wherein the deep learning model comprises an encoder network configured to generate a latent space representation of the initial transform domain mask and a decoder network configured to generate the improved mask based on the latent space representation generated by the encoder network.

* * * * *